(No Model.)

J. TILTON.
SEWER GAS TRAP.

No. 368,793. Patented Aug. 23, 1887.

Witnesses
J. W. Fowler
W. H. Patterson

Inventor
John Tilton;
By his Attorneys
Dewey and Co

UNITED STATES PATENT OFFICE.

JOHN TILTON, OF SAN FRANCISCO, CALIFORNIA.

SEWER GAS-TRAP.

SPECIFICATION forming part of Letters Patent No. 368,793, dated August 23, 1887.

Application filed April 7, 1887. Serial No. 234,087. (No model.)

*To all whom it may concern:*

Be it known that I, JOHN TILTON, of the city and county of San Francisco, State of California, have invented an Improvement in Sewer Gas-Traps; and I hereby declare the following to be a full, clear, and exact description of the same.

My invention relates to an improved gas-trap, which is especially intended to cut off communication between sinks or hoppers into which water is poured and the discharge or sewer with which they communicate.

It consists of a cap or float properly guided within a chamber and closing upwardly by its buoyancy or the action of a spring, said float being provided with a stem by which it may be depressed and a device by which it may be held open when desired.

Figure 1:
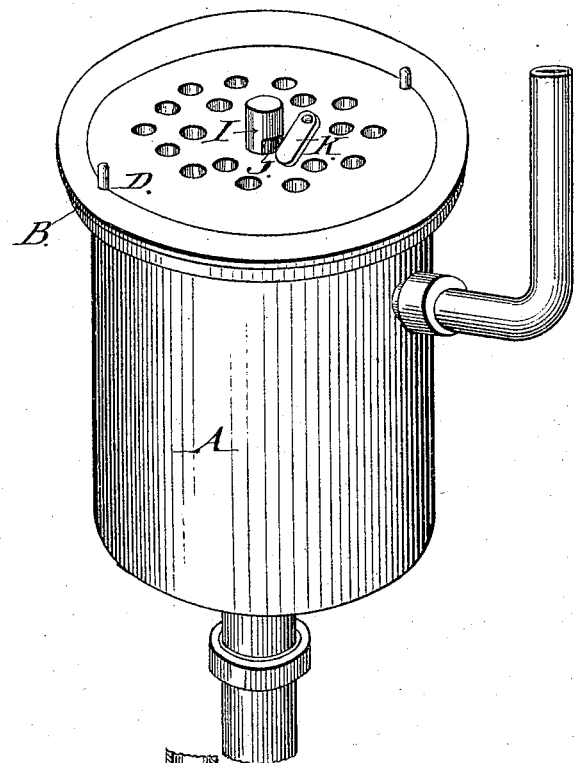
Figure 2:
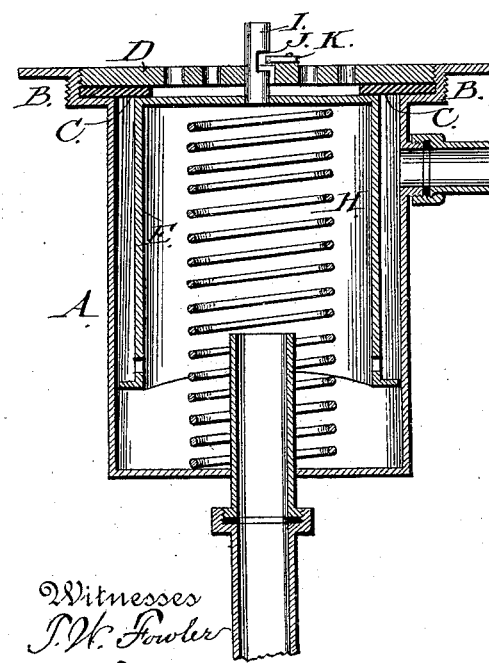
Figure 3:
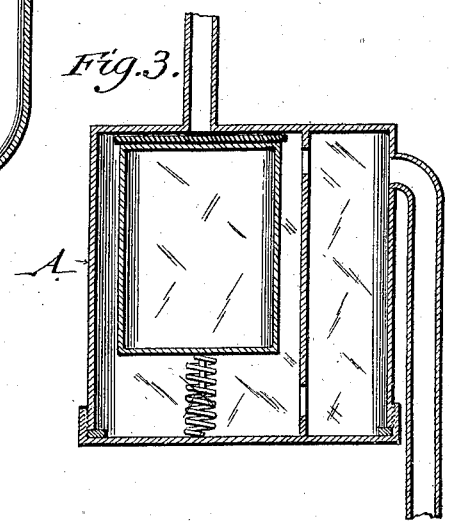

Referring to the accompanying drawings for a more complete explanation of my invention, Figure 1 is a perspective view of my device. Fig. 2 is a vertical section. Fig. 3 is a modification.

A is a chamber of considerable size formed beneath the sink or receptacle, into which the water is to be poured. A rim, B, around the upper part of this chamber receives a circular rubber or other elastic ring or gasket, C, which serves the purpose of making a tight joint for the perforated screw-cap D, which is screwed down upon it, and through the perforations of which water from the sink or receptacle may escape into the chamber below. The inner edge of the ring projects inward sufficiently to allow the top of the float E to close against it, and thus form a tight joint from below. This float, which may be open at the bottom, or closed, if desired, fits into the chamber A beneath the sink, and may have a spiral or other spring, H, so placed as to force it up and hold it against the lower part of the rubber gasket in case there should be little or no water in the chamber or to better insure a perfect gas-tight joint. From the upper part of this float a spindle or stem, I, rises centrally and passes through a corresponding central hole in the perforated disk, so that its upper end extends above the surface of the disk. The outlet from the chamber A may be made at one side near the top and the discharge-pipe connected by a coupling-joint, or it may be made through a pipe extending up into the chamber from the bottom, as shown in Fig. 1. In some cases it may be desired to inclose within an outer cylindrical chamber two smaller chambers, in one of which the float works, and the other at one side, into which the water passes from the float-chamber and from which it escapes through the discharge-pipe opening from the side of it, as before described. In this case the outer cylindrical chamber, which incloses the whole, would have the screw-caps fitted to it in the same manner as shown in Fig. 1. The float is so proportioned and weighted that the water contained within the float-chamber A, or that in conjunction with the spring, will act to keep the float forced up against the gasket, and thus keep the passage closed until water is poured into the sink or receptacle, so as to produce sufficient weight, passing through the holes in the disk D and overcoming the buoyant power of the float, so as to depress it and allow the water to escape. As soon as the water within the sink or receptacle has nearly or quite all passed out the buoyancy of the float E, assisted by the action of the spring, will be sufficient to again close the passage and make a tight joint.

In order to hold the valve open, if it be desired to operate it in that manner, I have shown a pivoted arm or plate, K, which is pivoted or fulcrumed in the top of the perforated disk, so that one end may swing over the top of the upwardly-projecting stem I when the latter has been depressed, and when in this position the float will be kept down, so that the water can flow out at all sides.

When it is desired to have the connection cut off, by moving this arm or switch the elastic bar of the float will again raise it and close the opening.

A notch, J, is made in one side of the stem I, and the arms K will engage this notch when the float is up, thus preventing it being opened unless desired.

Having thus described my invention, what I claim as new, and desire to secure by Letters Patent, is—

In a sewer gas-trap, the chamber having the spring-actuated float, the discharge pipe or trap opening outwardly from the chamber, and the stem rising vertically from the top and center of the float, in combination with an elastic or flexible ring or gasket, a perforated disk, which closes the top of the chamber and makes a tight joint upon the elastic ring, while the interior of the ring forms a seat for the float, and a swinging arm pivoted upon the disk so as to engage the float-stem, so that the float may be held and locked in a position either open or closed, substantially as herein described.

In witness whereof I have hereunto set my hand.

JOHN TILTON.

Witnesses:
S. H. NOURSE,
H. C. LEE.